(12) United States Patent
Lee et al.

(10) Patent No.: US 10,991,938 B2
(45) Date of Patent: Apr. 27, 2021

(54) LITHIUM COMPLEX OXIDE

(71) Applicant: ECOPRO BM CO., LTD., Cheongju-si (KR)

(72) Inventors: Jung Han Lee, Cheongju-si (KR); Moon Ho Choi, Cheongju-si (KR); Jun Won Suh, Seoul (KR); Sung Jin Jang, Cheongju-si (KR); Ji Hyun Nam, Cheongju-si (KR); Seung Woo Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 26 days.

(21) Appl. No.: 16/105,180

(22) Filed: Aug. 20, 2018

(65) Prior Publication Data

US 2019/0334163 A1    Oct. 31, 2019

(30) Foreign Application Priority Data

Apr. 25, 2018    (KR) .......................... 10-2018-0048157

(51) Int. Cl.
| | |
|---|---|
| *H01M 4/36* | (2006.01) |
| *H01M 4/505* | (2010.01) |
| *H01M 4/525* | (2010.01) |
| *C01G 53/00* | (2006.01) |
| *H01M 4/02* | (2006.01) |
| *H01M 10/052* | (2010.01) |

(52) U.S. Cl.
CPC ............ *H01M 4/364* (2013.01); *C01G 53/50* (2013.01); *H01M 4/505* (2013.01); *H01M 4/525* (2013.01); *H01M 10/052* (2013.01); *C01P 2002/72* (2013.01); *C01P 2002/76* (2013.01); *C01P 2006/40* (2013.01); *H01M 2004/028* (2013.01)

(58) Field of Classification Search
CPC ....... C01G 53/42; C01G 53/50; H01M 4/364; H01M 4/525; H01M 4/505; H01M 10/052
USPC .............. 252/182.1, 506, 509; 429/223, 224, 429/231.95
See application file for complete search history.

(56) References Cited

U.S. PATENT DOCUMENTS

| 2015/0010819 A1* | 1/2015 | Lee ........................ H01M 4/525 429/221 |
| 2016/0164094 A1* | 6/2016 | Takei .................... H01M 4/505 429/223 |

FOREIGN PATENT DOCUMENTS

CN            105118985 A   * 12/2015    ........ H01M 10/0525

* cited by examiner

*Primary Examiner* — Tri V Nguyen
(74) *Attorney, Agent, or Firm* — Saliwanchik, Lloyd & Eisenschenk

(57) ABSTRACT

The present invention relates to a lithium complex oxide, and more specifically, to a lithium complex oxide of which a range of $FWHM_{(104)}$ values maintains a constant relationship with a molar fraction of nickel when measuring XRD defined by a hexagonal lattice having a R-3m space group. The lithium complex oxide according to the present invention exhibits an effect of improving lifetime properties of the cells including high Ni-based cathode active materials accordingly by enabling a range of the $FWHM_{(104)}$ values at (104) peaks defined b the hexagonal lattice having the R-3m space group to maintain a constant relationship with the molar fraction of nickel, thereby maintaining the primary particles in a predetermined size range.

4 Claims, 11 Drawing Sheets

LITHIUM COMPLEX OXIDE

BACKGROUND OF THE INVENTION

Field of the Invention

The present invention relates to a lithium complex oxide, and more specifically, to a lithium complex oxide exhibiting an effect of improving lifetime properties of a battery, the lithium complex oxide of which primary particles are maintained in a predetermined size range such that a full width at half maximum (FWHM) value range of (104) peaks of XRD defined by a hexagonal lattice having a R-3m space group maintains a constant relationship with a molar fraction of nickel in the lithium complex oxide, and which comprises a Ni rich-based cathode active material accordingly.

Related Art

High energy densification of the lithium batteries in addition to miniaturization and weight lightening of lithium batteries to coincide with miniaturization and high performance of various devices have become crucial. That is, high voltage and high capacity lithium batteries have become important.

Complex metal oxides such as $LiCoO_2$, $LiMn_2O_4$, $LiNiO_2$, $LiMnO_2$ and the like as examples of a lithium complex oxide used as a cathode active material of the lithium batteries have been studied. $LiCoO_2$ among the lithium complex oxides has been used the most due to its excellent lifetime properties and charging and discharging efficiency. However, $LiCoO_2$ has a disadvantage of limitations in price competitiveness since $LiCoO_2$ has low structural stability, and is expensive due to resource limitations in cobalt used as a raw material.

Lithium manganese oxides such as $LiMnO_2$, $LiMn_2O_4$ and the like have advantages of excellent thermal stability and inexpensive prices. However, the lithium manganese oxides have problems of small capacities and deteriorated high temperature characteristics.

Further, a $LiNiO_2$ based cathode active material exhibits battery properties of a high discharge capacity. However, it is very difficult to synthesize the $LiNiO_2$ based cathode active material due to a cation mixing problem between Li and a transition metal, and the $LiNiO_2$ based cathode active material has a big problem in output (rate) characteristics accordingly.

In order to supplement the disadvantages, a demand in a Ni rich system having a Ni content of 60% or more as a cathode active material for a secondary battery has started to increase. However, the active material of the Ni rich system has an excellent advantage of exhibiting high capacity, whereas the active material of the Ni rich system has a problem that Li/Ni cation mixing increases structural instability according as the Ni content is increased, and a problem that physical interruption of internal particles, deepening of electrolyte depletion, and the like due to micro-cracks rapidly deteriorate lifetime properties at room temperature and high temperatures.

It has been known that the generation of micro-cracks which are known to cause lifetime deterioration of a Ni rich cathode active material has a correlation with sizes of the primary particles of the cathode active material. Specifically, it has been known that, as the sizes of the primary particles are decreased, the generation of cracks due to contraction/expansion repetition of the particles is suppressed. However, there is a problem that discharge capacity is decreased when the sizes of the primary particles are decreased, and lifetime properties may be deteriorated if the sizes of the primary particles are reduced when the content of nickel in the cathode active material is increased. Therefore, in order to improve lifetime properties of the Ni rich cathode active material, correlations of the content of nickel, the sizes of the primary particles and the discharge capacity should be considered.

On the other hand, it has been known that the sizes of the primary particles have an inversely proportional correlation with full width at half maximum (FWHM) values of XRD measurement values according to Scherrer equation. Scherrer equation (P. Scherrer; Goettinger Nachrichten 2, 98 (1918)) is a well-known equation for calculating sizes of aligned domains from X-ray diffraction data. In order to avoid variations in machine verses machine, a standardized sample may be used for the correction purpose. Therefore, when the FWHM values of the Ni rich cathode active material are adjusted to a predetermined range, the sizes of the primary particles can be adjusted, and lifetime properties and capacity properties can be improved accordingly.

SUMMARY OF THE INVENTION

The present invention provides a lithium complex oxide having improved lifetime properties and capacity properties by adjusting the FWHM values to a predetermined range during XRD measurement according to the content of nickel in the active material in order to solve the foregoing problems of the Ni rich lithium complex oxide.

To achieve this, the present invention provides a lithium complex oxide of which primary particles are aggregated secondary particles and represented by the following chemical formula 1, in which a range of FWHM (deg., 2θ) values at (104) peaks during the measurement of XRD defined by a hexagonal lattice having a R-3m space group is represented by the following relation formula 1, and in which $FWHM_{(104)}$ of relation formula 1 is represented by the following relation formula 2:

$$Li_aNi_xCo_yMn_zM_{1-x-y-z}O_2 \quad \text{[Chemical Formula 1]}$$

In chemical formula 1, M is selected from the group consisting of B, Ba, Ce, Cr, F, Mg, Al, Cr, V, Ti, Fe, Zr, Zn, Si, Y, Nb, Ga, Sn, Mo, W, P, Sr, and a combination thereof, 0.9≤a≤1.3, 0.6≤x≤1.0, 0.0≤y≤0.4, 0.0≤z≤0.4, 0.0≤1-x-y-z≤0.4, $$-0.025 < FWHM_{(104)} - \{0.04+(x-0.6)\times 0.25\} \le 0.025$$
[Relation formula 1]

$$FWHM_{(104)} = FWHM_{chemical\,formula\,1\,powder(104)} - FWHM_{Si\,powder(220)}$$
[Relation formula 2]

In relation formula 2, $FWHM_{chemical\,formula\,1\,powder\,(104)}$ indicates a FWHM (full width at half maximum) value at the (104) peak observed near 44.5° (2θ) during XRD measurement of the lithium complex oxide, and In relation formula 2, $FWHM_{Si\,powder\,(220)}$ indicates a FWHM value at a (220) peak observed near 47.3° (2θ) during XRD measurement of the Si powder.

When an XRD analysis is performed on a lithium complex oxide according to the present invention as shown in relation formula 1, the range of the FWHM values at the (104) peaks maintains a constant relationship with the content x of Ni in the active material.

In the lithium complex oxide according to the present invention, because a deviation and an error are generated in FWHM values by conditions of analysis equipment, an X-ray source, measurement conditions, and others during the XRD analysis, the FWHM value is corrected to the FWHM value of the Si powder as a standard sample according to the relationship fomula 2.

In the lithium complex oxide according to the present invention, $FWHM_{(104)}$ represented by relation formula 2 is in a range of 0.108° (2θ) to 0.162° (2θ) when the content x of nickel in chemical formula 1 is 0.97 to 0.99.

In the lithium complex oxide according to the present invention, $FWHM_{(104)}$ represented by relation formula 2 is in a range of 0.098° (2θ) to 0.152° (2θ) when the content x of nickel in chemical formula 1 is 0.93 to 0.95.

In the lithium complex oxide according to the present invention, $FWHM_{(104)}$ represented by relation formula 2 is in a range of 0.083° (2θ) to 0.137° (2θ) when the content x of nickel in chemical formula 1 is 0.87 to 0.89.

In the lithium complex oxide according to the present invention, $FWHM_{(104)}$ represented by relation formula 2 is in a range of 0.063° (2θ) to 0.117° (2θ) when the content x of nickel in chemical formula 1 is 0.79 to 0.81.

In the lithium complex oxide according to the present invention, $FWHM_{(104)}$ represented by relation formula 2 is in a range of 0.038° (2θ) to 0.092° (2θ) when the content x of nickel in chemical formula 1 is 0.69 to 0.71.

In the lithium complex oxide according to the present invention, $FWHM_{(104)}$ represented by relation formula 2 is in a range of 0.015° (2θ) to 0.070° (2θ) when the content x of nickel in chemical formula 1 is 0.60 to 0.62.

Furthermore, the present invention provides a lithium complex oxide of which primary particles are aggregated secondary particles and represented by the following chemical formula 2, and in which a range of FWHM (deg., 2θ) values at (104) peaks during analysis of XRD defined by a hexagonal lattice having a R-3m space group is represented by the following relation formula 3:

$$Li_aNi_xCo_yMn_zM_{1-x-y-z}O_2 \quad \text{[Chemical Formula 2]}$$

[Relation formula 3]

In chemical formula 2, M is selected from the group consisting of B, Ba, Ce, Cr, F, Mg, Al, Cr, V, Ti, Fe, Zr, Zn, Si, Y, Nb, Ga, Sn, Mo, W, P, Sr, and a combination thereof, 0.9≤a≤1.3, 0.6≤x≤1.0, 0.0≤y≤0.4, 0.0≤z≤0.4, 0.0≤1-x-y-z≤0.4, In relation formula 3, $FWHM_{chemical\ formula\ 2\ powder\ (104)}$ indicates a FWHM (full width at half maximum) value at the (104) peak observed near 44.5° (2θ) during XRD analysis of the lithium complex oxide.

Although it has not been specifically described in the present invention, various peaks such as (003), (101) and the like in addition to the (104) peak are observed during the XRD analysis of the lithium complex oxide according to the present invention, and the respective peaks have different FWHM values. Different FWHM value ranges which maintain constant relationships with the content of nickel may exist even in peaks detected at different locations in addition to the (104) peak during the XRD analysis of the lithium complex oxide according to the present invention.

DESCRIPTION OF EXEMPLARY EMBODIMENTS

Hereinafter, the present invention will be described more in detail with reference to Examples, but the present invention is not limited thereto.

<Example 1> Synthesizing Cathode Active Materials

Cathode active materials were synthesized by compositions as in the following Table 1 the content of nickel became 0.8.

First, nickel sulfate, cobalt sulfate and manganese sulfate were prepared, and precursors were produced by performing a coprecipitation reaction of the prepared nickel sulfate, cobalt sulfate and manganese sulfate. After adding LiOH as a lithium compound to the produced precursors to obtain mixtures and primarily firing the mixtures under the presence of $N_2$ and $O_2$/(1 to 100 LPM) at a heating rate of 1° C./min to 20° C./min for 4 to 20 hours based on a sustain period to obtain primarily fired materials, cathode active materials for a lithium secondary battery were prepared by secondly firing the primarily fired materials.

Next, after preparing distilled water and constantly maintaining temperature of the distilled water at 5 to 40° C., the prepared cathode active materials for the lithium secondary battery were injected into the distilled water to wash the cathode active materials for the lithium secondary battery with the distilled water for 0.1 to 10 hours while maintaining temperature of the distilled water.

After filter-pressing the washed cathode active materials, the filter-pressed cathode active materials were dried at 50 to 300° C. for 3 to 24 hours.

TABLE 1

| | Heat treatment temperature | Li/Metal (mol ratio) | Molar fraction | | |
|---|---|---|---|---|---|
| | | | Ni/(Ni + Co + Mn) | Co/(Ni + Co + Mn) | Mn/(Ni + Co + Mn) |
| Comparative Example-1 | 800° C. | 1.01 | 0.80 | 0.11 | 0.09 |
| Comparative Example-2 | 760° C. | 1.02 | 0.80 | 0.10 | 0.10 |
| Example-1-1 | 790° C. | 1.02 | 0.80 | 0.11 | 0.09 |
| Example-1-2 | 770° C. | 1.01 | 0.80 | 0.10 | 0.10 |
| Example-1-3 | 780° C. | 1.00 | 0.80 | 0.09 | 0.11 |
| Example-1-4 | 780° C. | 1.02 | 0.80 | 0.11 | 0.09 |

<Experimental Example> Measuring XRD Values

Figure 1:
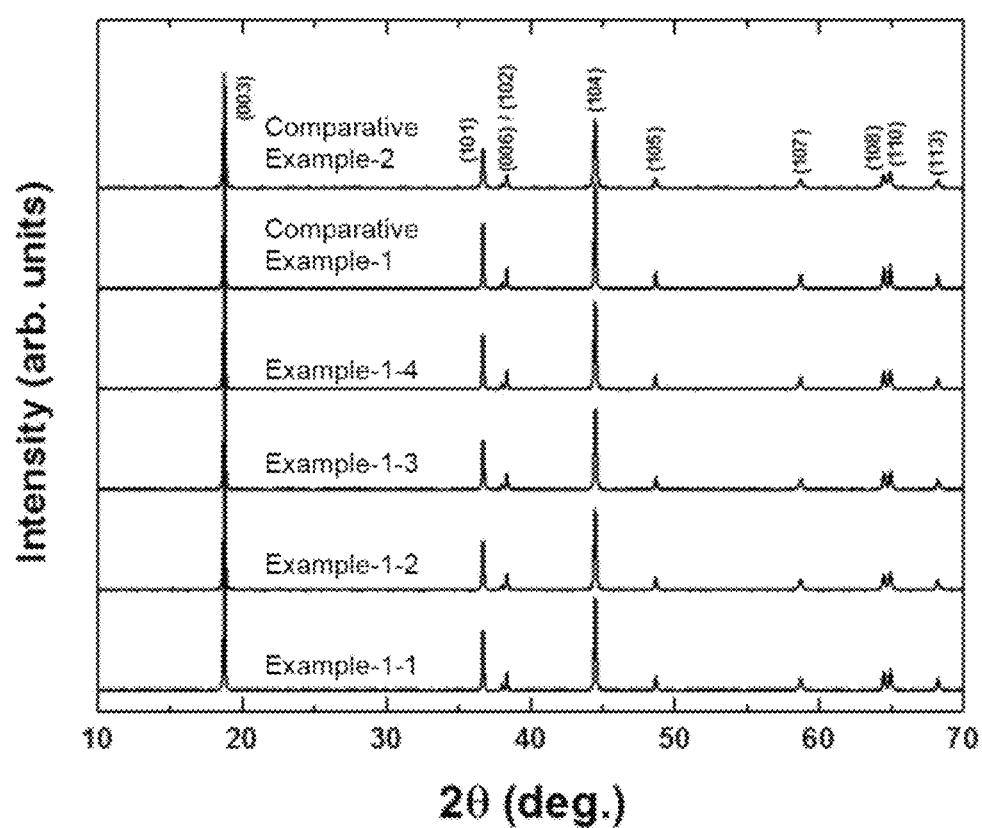
FIG. 1 shows XRD measurement results of cathode active materials according to Examples and Comparative Examples of the present invention.

After measuring XRD values for the synthesized cathode active materials of Examples of the present invention, measurement results are shown in FIG. 1.

When measuring the XRD values, a Cu-Kα α1 radiation source was used as an X-ray source, and the XRD values were measured at a step interval of 0.02° in a 10-70° (2θ) range by a θ-2θ scan (Bragg-Brentano parafocusing geometry) method.

It could be confirmed as shown in FIG. 1 that cathode active materials of Examples 1 to 4 had a hexagonal α α-NaFeO₂ (R-3m) structure.

Figure 2:
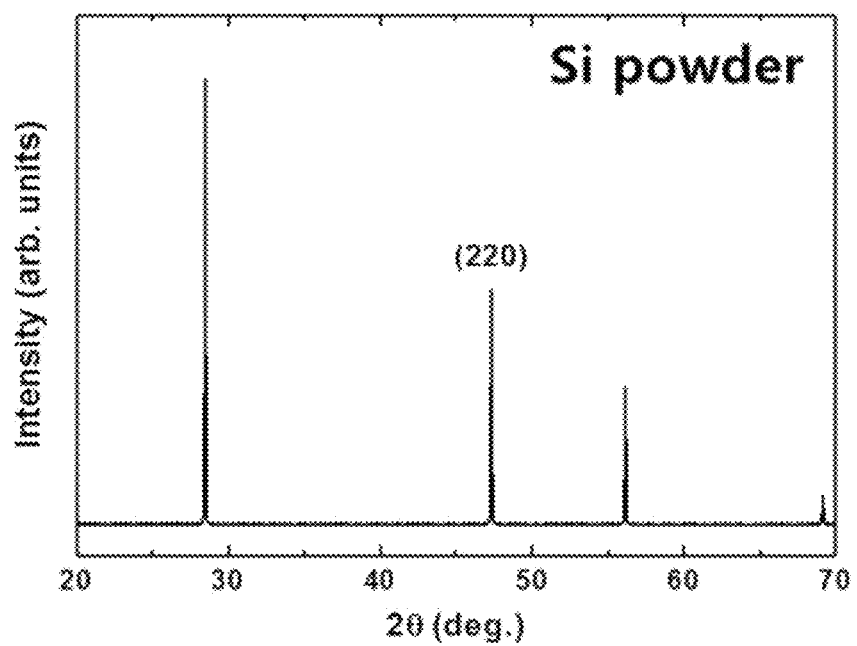
FIG. 2 shows an XRD measurement result of the Si powder according to Example of the present invention.

After measuring XRD values for a Si powder at the same condition in the same equipment, measurement results are shown in FIG. 2. An Si powder (product No. 215619) produced by Sigma-Aldrich Corporation was used as the Si powder.

In case of the Si powder, FWHM values at (220) peaks observed near 47.3° (2θ) were measured, and the measured FWHM(220) values for the Si powder were 0.0807° (2θ).

<Experimental Example> Measuring Full Width at Half Maximum (FWHM) Values

FWHM(104) values measured for cathode active materials of the present invention synthesized in Examples using the XRD values measured in Experimental Example and FWHM(104) values corrected using Si powder values are shown in the following FIG. 3 and Table 2.

TABLE 2

|  | Ni/(Ni + Co + Mn) | $FWHM_{NCM\ powder\ (104)}$ | $FWHM_{NCM\ powder\ (104)}$ − $FWHM_{Si\ powder\ (220)}$ |
|---|---|---|---|
| Comparative Example 1 | 0.80 | 0.1380 | 0.0573 |
| Comparative Example 2 | 0.80 | 0.2097 | 0.1290 |
| Example 1-1 | 0.80 | 0.1596 | 0.0789 |
| Example 1-2 | 0.80 | 0.1839 | 0.1032 |
| Example 1-3 | 0.80 | 0.1754 | 0.0947 |
| Example 1-4 | 0.80 | 0.1654 | 0.0847 |

The FWHM(104) values for the cathode active materials of the present invention synthesized in Examples and the FWHM(220) values for the Si powder were measured by fitting of Gaussian function, and the fitting of Gaussian function for measuring the FWHM values can be performed using various academic/open/commercial software programs known to those skilled in the art.

Figure 3:
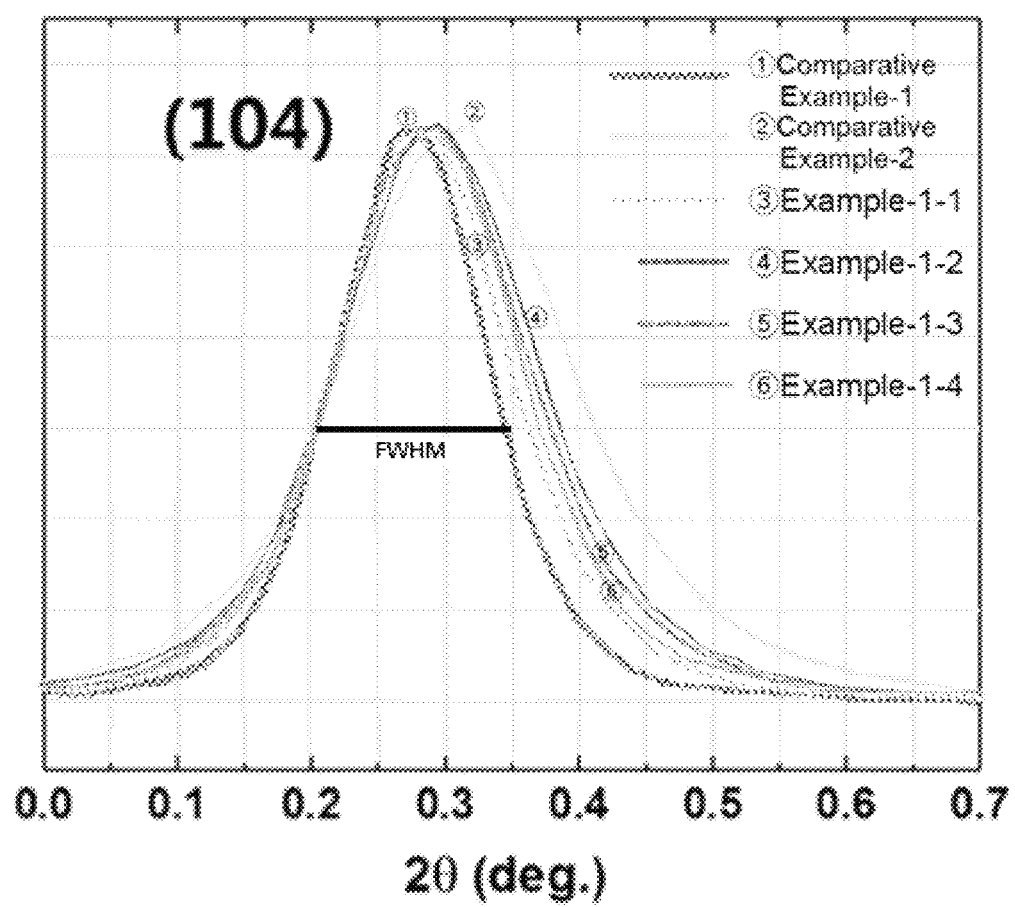
FIG. 3 shows XRD measurement results of the cathode active materials according to Examples and Comparative Examples of the present invention.

It can be confirmed that, when the Ni content is 0.8 in Table 2 and FIG. 3, corrected HWHM (104) values are maintained in a range of 0.0789° (2θ) to 0.1032° (2θ).

<Manufacturing Examples> Manufacturing Cells

Slurries were prepared by mixing the cathode active materials for the lithium secondary battery prepared according to Examples and Comparative Examples, artificial graphite as a conductive material, and polyvinylidene fluoride (PVdF) at a weight ratio of 85:10:5. Cathodes for the lithium secondary battery were produced by uniformly applying the slurries onto an aluminum foil with a thickness of 15 μm and vacuum drying the slurries uniformly applied onto the aluminum foil at 135° C.

Coin cells were manufactured by a common method using the cathodes and a lithium foil as a counter electrode, using a porous polypropylene film with a thickness of 20 μm as a separator, and using an electrolyte prepared by dissolving LiPF6 at a concentration of 1.15 M into a solvent having ethylene carbonate, diethyl carbonate and ethyl methyl carbonate mixed therein at a volume ratio of 3:1:6.

Figure 4:
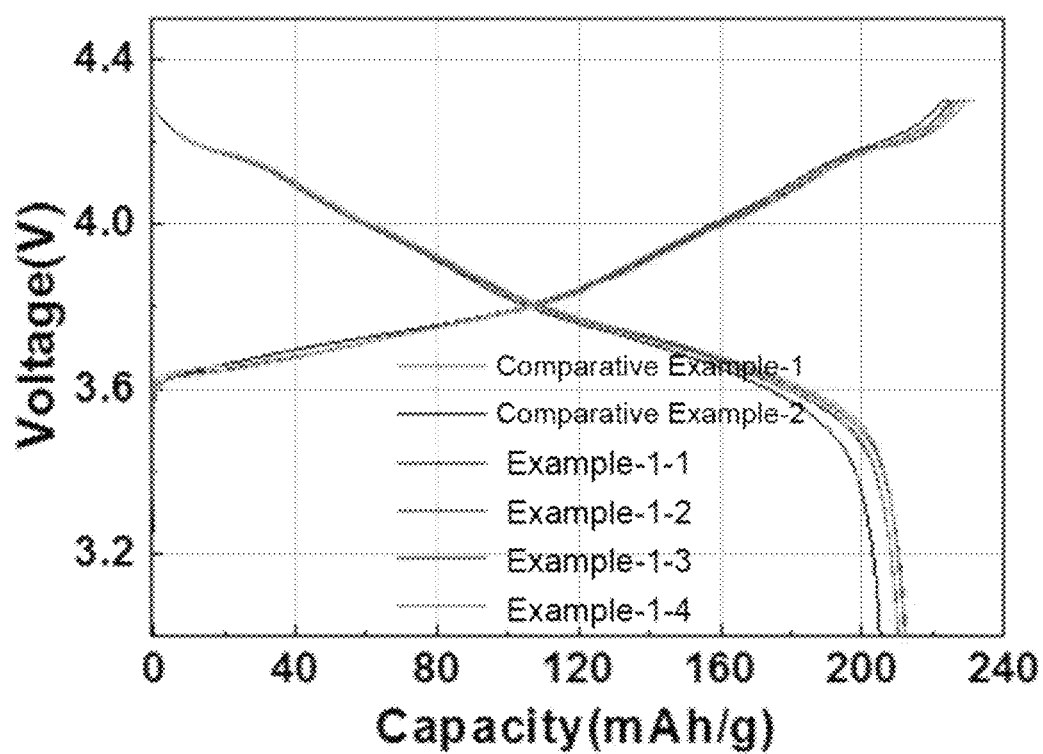
FIG. 4 and FIG. 5 show results of measuring properties of batteries including the cathode active materials according to Examples and Comparative Examples of the present invention.
Figure 5:
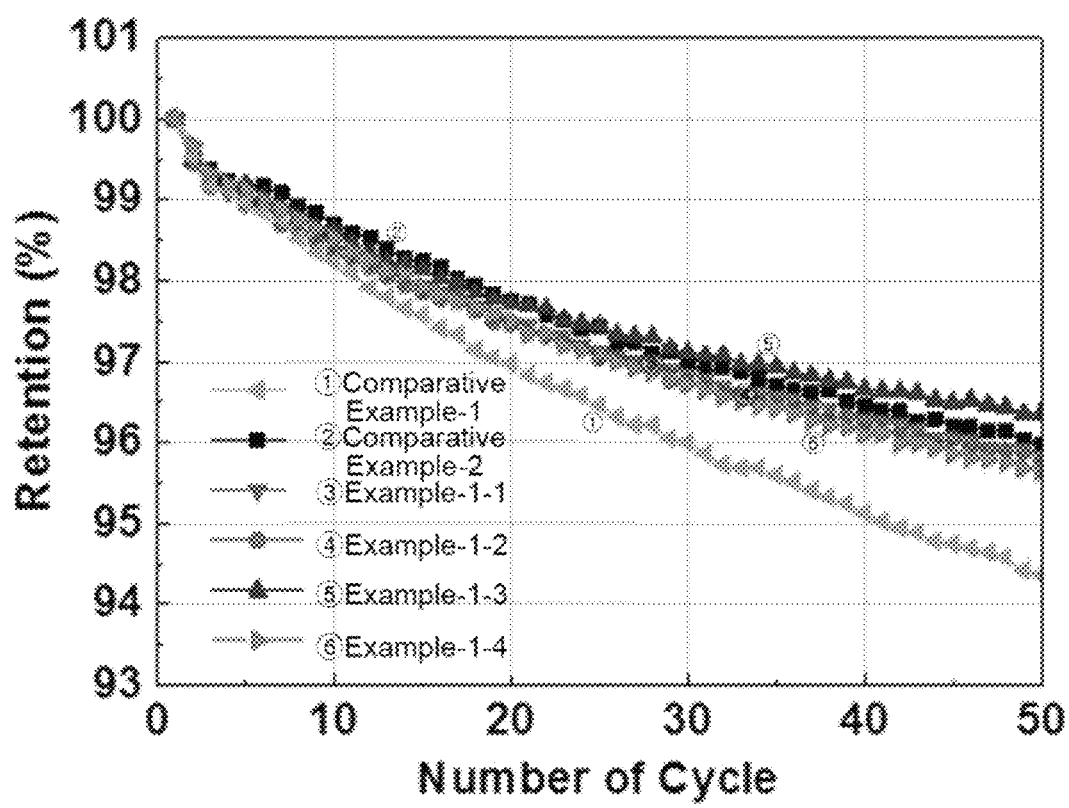

<Experimental Example> Measuring Capacity Properties and Lifetime Properties of Cells After measuring capacity properties and lifetime properties for the cells including the prepared active materials of Examples and Comparative Examples, the measured capacity properties and lifetime properties for the cells are shown in FIG. 4, FIG. 5 and the following Table 3.

TABLE 3

|  | Ni/(Ni + Co + Mn) | $FWHM_{NCM\ powder\ (104)}$ − $FWHM_{Si\ powder\ (220)}$ | Discharge capacity (0.1 C. mAh/g) | Retention @50cyc(%) |
|---|---|---|---|---|
| Comparative Example-1 | 0.80 | 0.0573 | 212.3 | 94.4 |
| Comparative Example-2 | 0.80 | 0.1290 | 205.5 | 96.0 |
| Example-1-1 | 0.80 | 0.0789 | 212.7 | 95.8 |
| Example-1-2 | 0.80 | 0.1032 | 210.7 | 95.7 |
| Example-1-3 | 0.80 | 0.0947 | 210.5 | 95.7 |
| Example-1-4 | 0.80 | 0.0847 | 210.4 | 95.6 |

Figure 6:
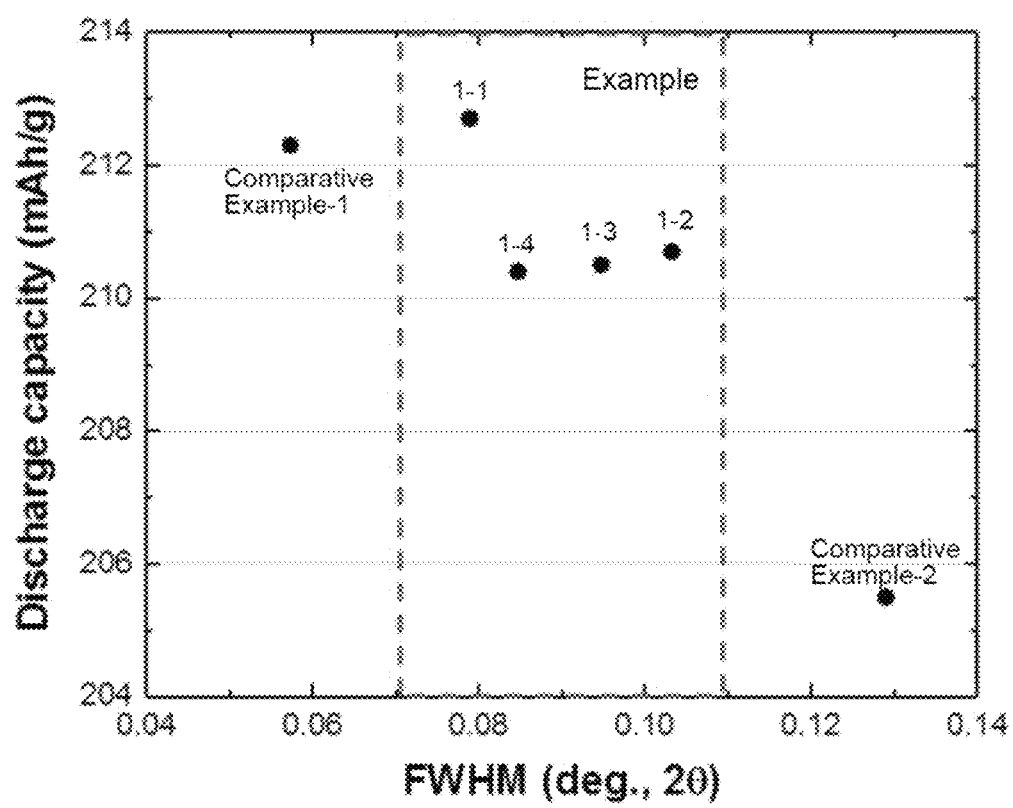
FIG. 6 to FIG. 11 exhibit results of comparing results of FWHM values and lifetime properties of the batteries including the cathode active materials according to Examples and Comparative Examples of the present invention.
Figure 7:
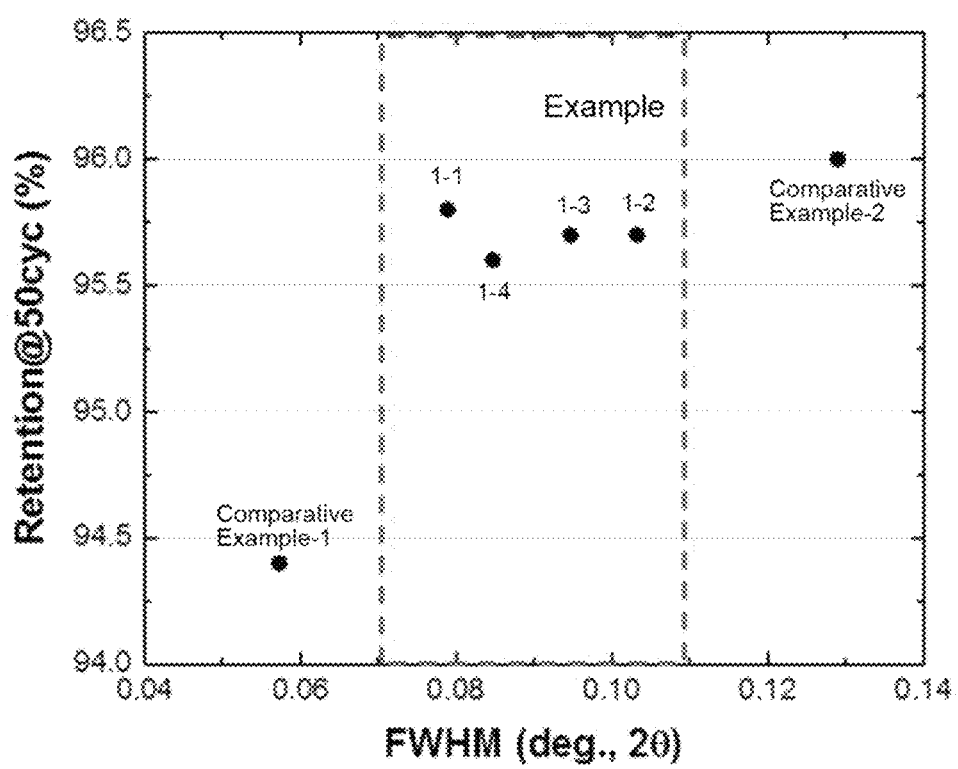

<Experimental Example> Measuring Capacity Properties and Lifetime Properties of the Cells According to FWHM Values After measuring capacity properties and lifetime properties for the cells including the prepared active materials of Examples and Comparative Examples with respect to FWHM values, the measured capacity properties and lifetime properties for the cells with respect to the FWHM values are shown in FIG. 6 and FIG. 7.

As shown in FIG. 6 and FIG. 7, it can be confirmed that, when the content of Ni is 0.8, corrected FWHM values are adjusted to a range of 0.0789° (2θ) to 0.1032° (2θ) by the present invention, and the capacity properties and the lifetime properties are improved accordingly.

<Example 2> Synthesizing Cathode Active Materials

Cathode active materials were synthesized by the same method as in Example 1 except that the content of Ni was adjusted to 0.88.

TABLE 4

| | Heat treatment temperature | Li/Metal (mol ratio) | Molar fraction | | |
|---|---|---|---|---|---|
| | | | Ni/(Ni + Co + Mn) | Co/(Ni + Co + Mn) | Mn/(Ni + Co + Mn) |
| Comparative Example-3 | 750° C. | 1.01 | 0.88 | 0.07 | 0.05 |
| Comparative Example-4 | 700° C. | 1.02 | 0.88 | 0.07 | 0.05 |
| Example-2-1 | 740° C. | 1.01 | 0.88 | 0.07 | 0.05 |
| Example-2-2 | 710° C. | 1.02 | 0.88 | 0.09 | 0.03 |
| Example-2-3 | 720° C. | 1.04 | 0.88 | 0.09 | 0.03 |
| Example-2-4 | 710° C. | 1.01 | 0.88 | 0.07 | 0.05 |

<Experimental Example> Measuring XRD Values

After measuring XRD values for the synthesized cathode active materials of Examples of the present invention, FWHM(104) values corrected using Si powder values for the cathode active materials of Examples of the present invention using the measured XRD values are shown in the following Table 5.

TABLE 5

| | Ni/(Ni + Co + Mn) | $FWHM_{NCM\ powder\ (104)}$ − $FWHM_{Si\ powder\ (220)}$ | Discharge capacity (0.1 C. mAh/g) | Retention @50cyc(%) |
|---|---|---|---|---|
| Comparative Example-3 | 0.88 | 0.0814 | 220.7 | 93.3 |
| Comparative Example-4 | 0.88 | 0.1376 | 216.0 | 92.9 |
| Example-2-1 | 0.88 | 0.1022 | 221.0 | 95.6 |
| Example-2-2 | 0.88 | 0.1126 | 220.3 | 95.3 |
| Example-2-3 | 0.88 | 0.0926 | 220.0 | 95.0 |
| Example-2-4 | 0.88 | 0.1252 | 220.6 | 94.8 |

It can be confirmed in Table 5 that, when the Ni content is 0.88, the corrected FWHM(104) values are maintained to a range of 0.0926° (2θ) to 0.1252° (2θ).

<Manufacturing Example> Manufacturing Cells

Slurries were prepared by mixing the cathode active materials for the lithium secondary battery prepared according to Examples and Comparative Examples respectively, artificial graphite as a conductive material, and polyvinylidene fluoride (PVdF) at a weight ratio of 85:10:5. Cathodes for the lithium secondary battery were produced by uniformly applying the slurries onto an aluminum foil with a thickness of 15 μm and vacuum drying the slurries uniformly applied onto the aluminum foil at 135° C.

Coin cells were manufactured by a common method using the cathodes and a lithium foil as a counter electrode, using a porous polypropylene film with a thickness of 20 μm as a separator, and using an electrolyte prepared by dissolving LiPF6 at a concentration of 1.15 M into a solvent having ethylene carbonate, diethyl carbonate and ethyl methyl carbonate mixed therein at a volume ratio of 3:1:6.

Figure 8:
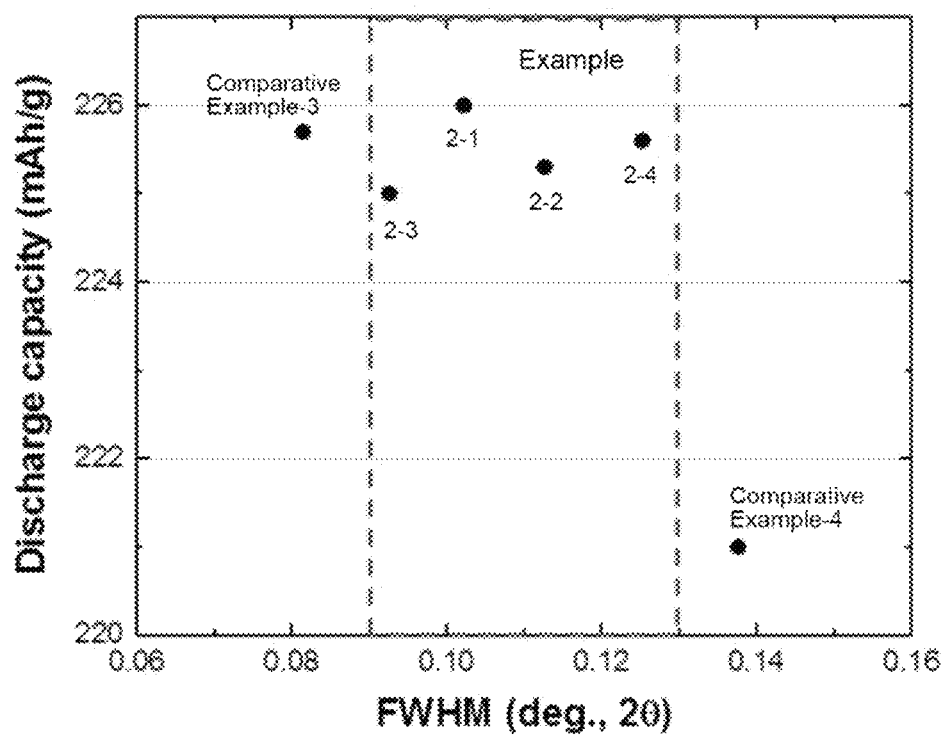
Figure 9:
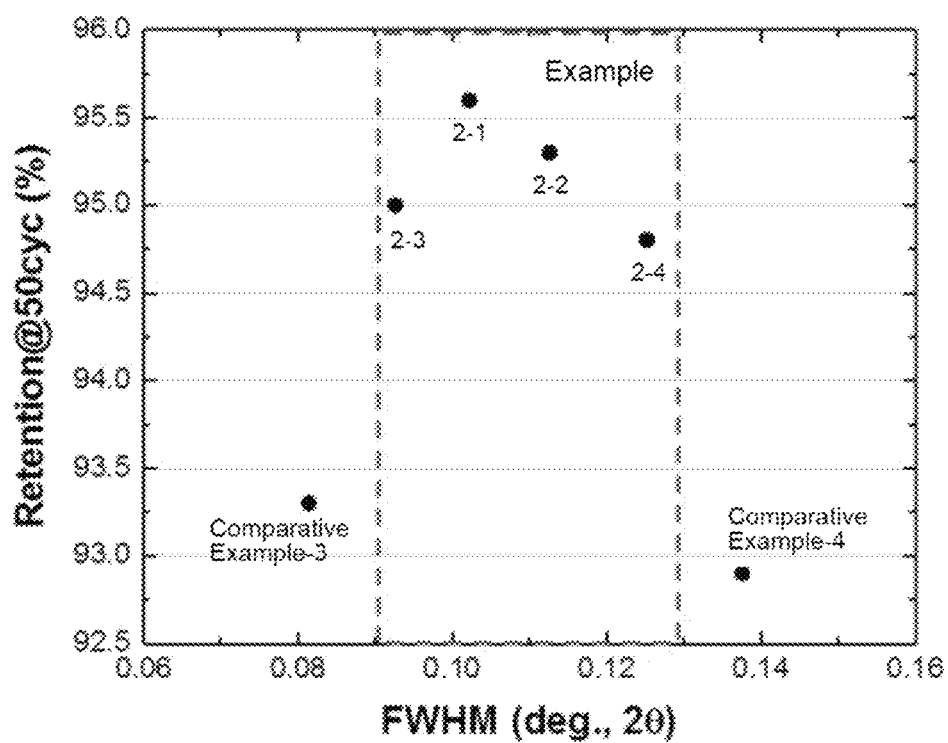

<Experimental Example> Measuring Capacity Properties and Lifetime Properties of the Cells After measuring capacity properties and lifetime properties for the cells including the active materials prepared in Examples and Comparative Examples, the measured capacity properties and lifetime properties for the cells are shown in Table 5, and the measured capacity properties and lifetime properties are shown in FIG. 8 and FIG. 9 according to FWHM values.

As shown in FIG. 8 and FIG. 9, it can be confirmed that, when the content of Ni is adjusted to 0.88, the FWHM values are adjusted to a predetermined range by the present invention, and the capacity properties and the lifetime properties are improved accordingly.

<Example 3> Synthesizing Cathode Active Materials

Cathode active materials with compositions represented in the following Table 6 were synthesized by the same method as in Example 1 except that the content of Ni was adjusted to 0.94.

TABLE 6

| | Heat treatment temperature | Li/Metal (mol ratio) | Molar fraction | | |
|---|---|---|---|---|---|
| | | | Ni/(Ni + Co + Mn) | Co/(Ni + Co + Mn) | Mn/(Ni + Co + Mn) |
| Comparative Example-5 | 740° C. | 1.03 | 0.94 | 0.03 | 0.03 |
| Comparative Example-6 | 710° C. | 1.04 | 0.94 | 0.03 | 0.03 |
| Example-3-1 | 740° C. | 1.01 | 0.94 | 0.03 | 0.03 |
| Example-3-2 | 730° C. | 1.03 | 0.94 | 0.03 | 0.03 |
| Example-3-3 | 720° C. | 1.04 | 0.94 | 0.03 | 0.03 |
| Example-3-4 | 720° C. | 1.01 | 0.94 | 0.03 | 0.03 |

<Experimental Example> Measuring XRD Values

After measuring XRD values for the synthesized cathode active materials of Examples of the present invention, measurement results are shown in FIG. 3.

XRD values for the Si powder were measured at the same condition in the same equipment. An Si powder (product No. 215619) produced by Sigma-Aldrich Corporation was used as the Si powder.

<Experimental Example> Measuring Full Width at Half Maximum (FWHM) Values

FWHM(104) values measured for cathode active materials of the present invention synthesized in Examples using the XRD values measured in Experimental Example and FWHM(104) values corrected using Si powder values are shown in the following FIG. 3 and Table 7.

TABLE 7

|  | Ni/(Ni + Co + Mn) | $FWHM_{NCM\ powder\ (104)}$ − $FWHM_{Si\ powder\ (220)}$ | Discharge capacity (0.1 C. mAh/g) | Retention @50cyc(%) |
|---|---|---|---|---|
| Comparative Example-5 | 0.94 | 0.0823 | 228.4 | 90.0 |
| Comparative Example-6 | 0.94 | 0.1655 | 225.3 | 90.1 |
| Example-3-1 | 0.94 | 0.1069 | 227.5 | 93.0 |
| Example-3-2 | 0.94 | 0.1127 | 227.0 | 93.5 |
| Example-3-3 | 0.94 | 0.1250 | 225.5 | 94.2 |
| Example-3-4 | 0.94 | 0.1351 | 226.2 | 94.0 |

It can be confirmed in Table 7 that, when the Ni content is 0.94, the corrected FWHM(104) values are maintained to a range of 0.1069° (2θ) to 0.1351° (2θ).

<Manufacturing Example> Manufacturing Cells

Cells were manufactured by the same method as in Manufacturing Examples using the cathode active materials for a lithium secondary battery prepared according to Examples and Comparative Examples respectively.

Figure 10:
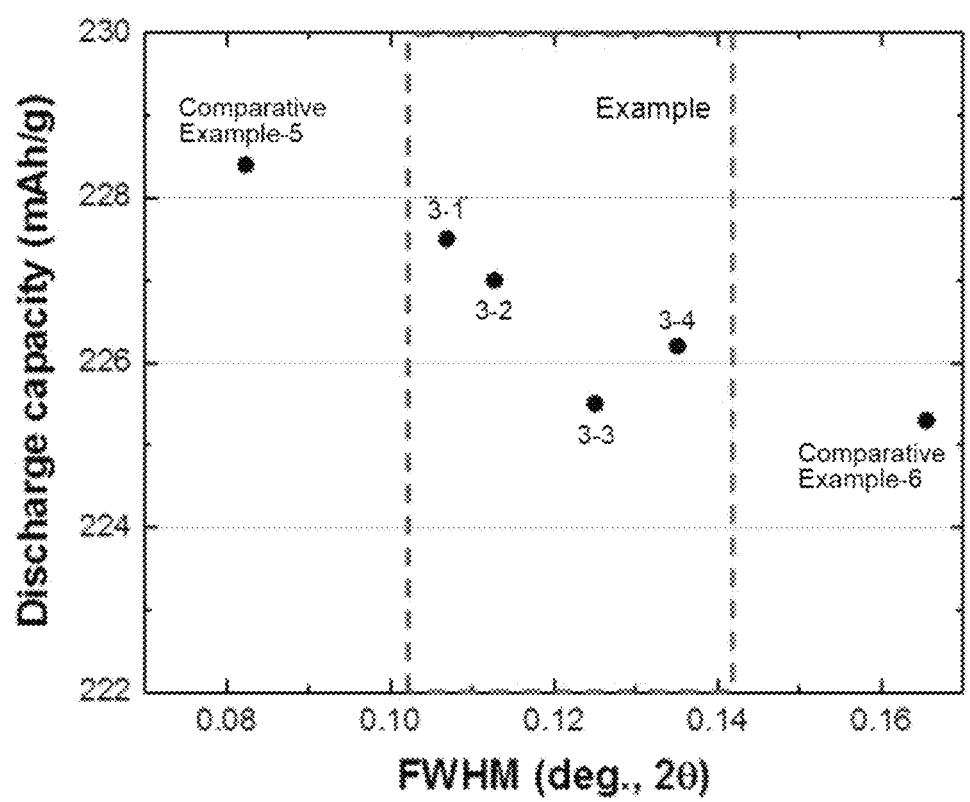
Figure 11:
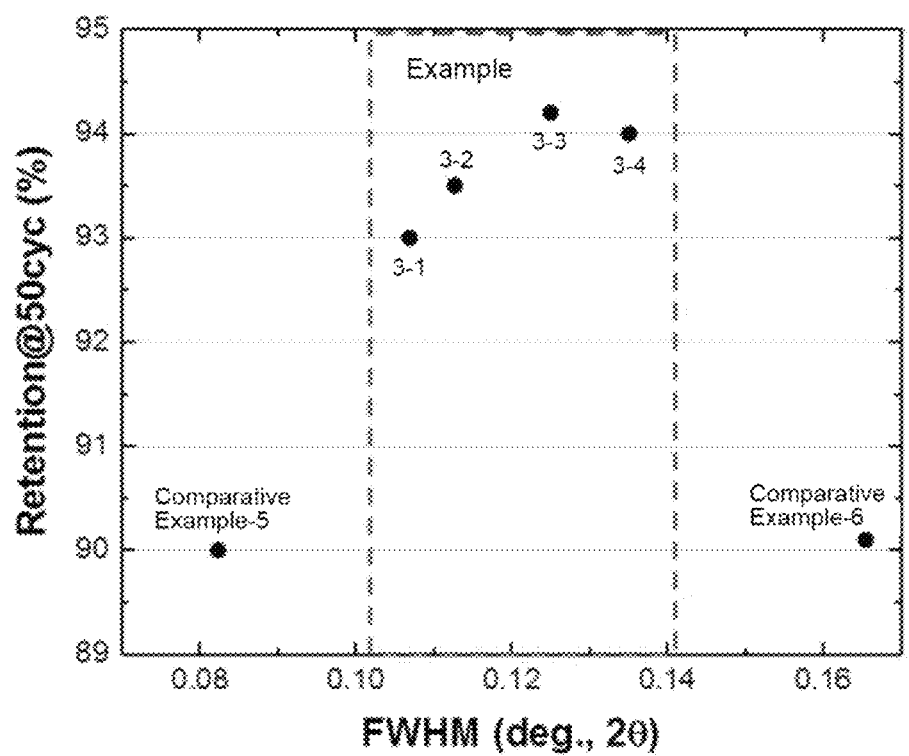

<Experimental Example> Measuring Capacity Properties and Lifetime Properties of the Cells According to FWHM Values After measuring capacity properties and lifetime properties for the cells including the prepared active materials of Examples and Comparative Examples according to FWHM values, the measured capacity properties and lifetime properties for the cells according to the FWHM values are shown in FIG. 10 and FIG. 11.

As shown in FIG. 10 and FIG. 11, it can be confirmed that, when the content of Ni is 0.94, the FWHM values are adjusted to a predetermined range by the present invention, and the capacity properties and the lifetime properties are improved accordingly.

The lithium complex oxide according to the present invention exhibits an effect of improving lifetime properties of a battery, the lithium complex oxide of which primary particles are maintained in a predetermined size range to inhibit micro-cracking of the particles such that the FWHM value range of the (104) peaks of XRD defined by the hexagonal lattice having the R-3m space group maintains a constant relationship with a molar fraction of nickel, and which comprises the Ni rich-based cathode active material accordingly.

What is claimed is:

1. A lithium complex oxide of which primary particles are aggregated secondary particles and represented by the following chemical formula 1, and in which a range of FWHM (deg., 2θ) values at (104) peaks during the measurement of XRD defined by a hexagonal lattice having a R-3m space group is represented by the following relation formula 1:

$$Li_aNi_xCo_yMn_zM_{1-x-y-z}O_2 \quad \text{[Chemical Formula 1]}$$

in chemical formula 1, M is selected from the group consisting of B, Ba, Ce, Cr, F, Mg, Al, Cr, V, Ti, Fe, Zr, Zn, Si, Y, Nb, Ga, Sn, Mo, W, P, Sr, and a combination thereof, $0.9 \leq a \leq 1.3$, $0.8 \leq x < 1.0$, $0.0 < y+z \leq 0.2$, $0.0 \leq 1-x-y-z < 0.2$;

$$-0.025 \leq FWHM_{(104)} - \{0.04 + (x-0.6) \times 0.25\} \leq 0.025$$
[Relation formula 1]

in relation formula 1, $FWHM_{(104)}$ of relation formula 1 is represented by the following relation formula 2:

$$FWHM_{(104)} = FWHM_{chemical\ formula\ 1\ powder\ (104)} - FWHM_{Si\ powder\ (220)} \quad \text{[Relation formula 2]}$$

in relation formula 2, $FWHM_{chemical\ formula\ 1\ powder\ (104)}$ indicates a FWHM (full width at half maximum) value at the (104) peak observed near 44.5° (2θ) during XRD measurement of the lithium complex oxide, and in relation formula 2, $FWHM_{Si\ powder\ (220)}$ indicates a FWHM value at a (220) peak observed near 47.3° (2θ) during XRD measurement of the Si powder.

2. The lithium complex oxide of claim 1, wherein $FWHM_{(104)}$ represented by relation formula 2 is in a range of 0.108° (2θ) to 0.162° (2θ) when the content x of nickel is 0.97 to 0.99.

3. The lithium complex oxide of claim 1, wherein $FWHM_{(104)}$ represented by relation formula 2 is in a range of 0.098° (2θ) to 0.152° (2θ) when the content x of nickel is 0.93 to 0.95.

4. The lithium complex oxide of claim 1, wherein $FWHM_{(104)}$ represented by relation formula 2 is in a range of 0.083° (2θ) to 0.137° (2θ) when the content x of nickel is 0.87 to 0.89.

* * * * *